United States Patent [19]

Kuo

[11] Patent Number: 4,698,265
[45] Date of Patent: Oct. 6, 1987

[54] BASE METAL RESISTOR

[75] Inventor: Charles C. Y. Kuo, Elkhart, Ind.

[73] Assignee: CTS Corporation, Elkhart, Ind.

[21] Appl. No.: 848,976

[22] Filed: Apr. 7, 1986

Related U.S. Application Data

[62] Division of Ser. No. 705,233, Feb. 25, 1985, Pat. No. 4,655,965.

[51] Int. Cl.$^4$ .............................................. B32B 17/06
[52] U.S. Cl. .................................. 428/432; 338/308; 428/427; 428/428; 428/433; 428/446; 428/451; 428/463; 428/467; 428/469; 428/522; 428/523; 428/697; 428/701; 428/702
[58] Field of Search ............................ 427/101, 126.2; 428/427, 432, 428, 433, 446, 451, 522, 523, 697, 701, 702; 338/308; 524/430; 252/518; 106/287.19

[56] References Cited

U.S. PATENT DOCUMENTS

| 4,215,020 | 7/1980 | Wahlers | 252/519 |
| 4,379,195 | 4/1983 | Prabhu et al. | 428/209 |
| 4,397,915 | 8/1983 | Wahlers et al. | 428/432 |

Primary Examiner—Theodore E. Pertilla
Attorney, Agent, or Firm—Rodger H. Flagg

[57] ABSTRACT

Base metal resistive paints, resistors made therefrom and method for making the resistive paint are disclosed. The base metal resistive paints comprise 20 to 25% tantala glass frit and 75 to 80% tin oxide, ground to a particle size of ten microns or less; and well mixed with 25 to 35% screening agent for subsequent screening upon a suitable substrate, and firing in an inert atmosphere at a peak temperature of about 900° C. The tantala glass frit preferably comprises 5 to 25% tantatum oxide. The tin oxide is preferably preheated at 450° to 600° C. in the presence of a reducing gas, prior to mixing with the tantala glass frit. The screening agent preferably forms no carbon residue when pyrolytically decomposed in an inert atmosphere during firing.

6 Claims, 7 Drawing Figures

EFFECTS OF FIRING TEMPERATURES ON TCR ($SnO_2$ REDUCED AT 520°C)

HOT TCR ----
COLD TCR ——

EFFECTS OF FIRING TEMPERATURES ON SHEET RESISTANCE $\Omega/\square$ ($SnO_2$ REDUCED AT 520°C)

FIG. 2A  EFFECTS OF FIRING TEMPERATURES ON TCR ($SnO_2$ REDUCED AT 450°C)
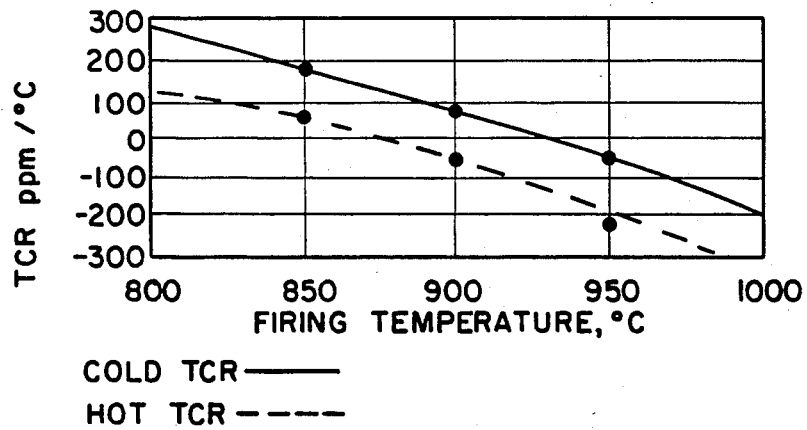
COLD TCR ———
HOT TCR -----
FIG. 2B  EFFECTS OF FIRING TEMPERATURES ON SHEET RESISTANCE Ω/□ ($SnO_2$ REDUCED AT 450°C)
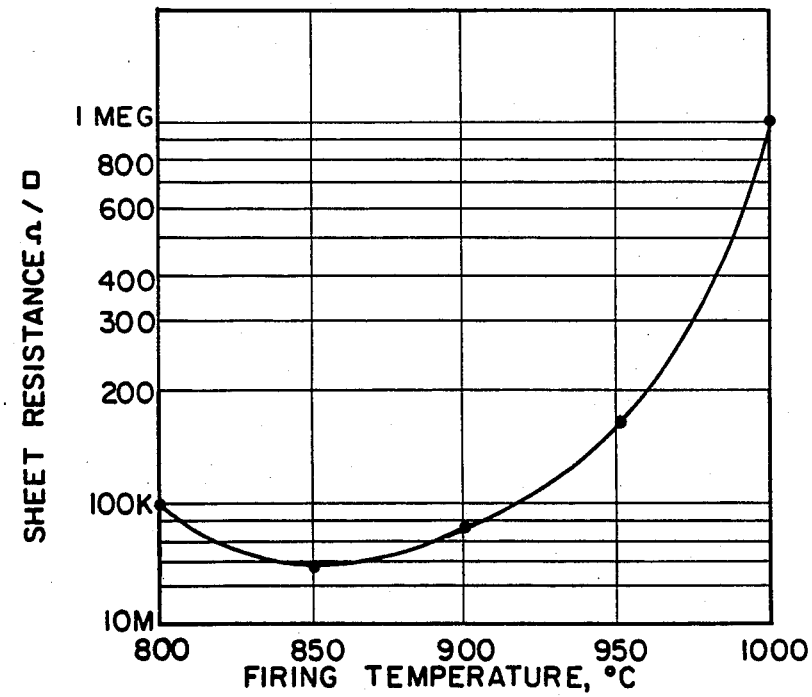

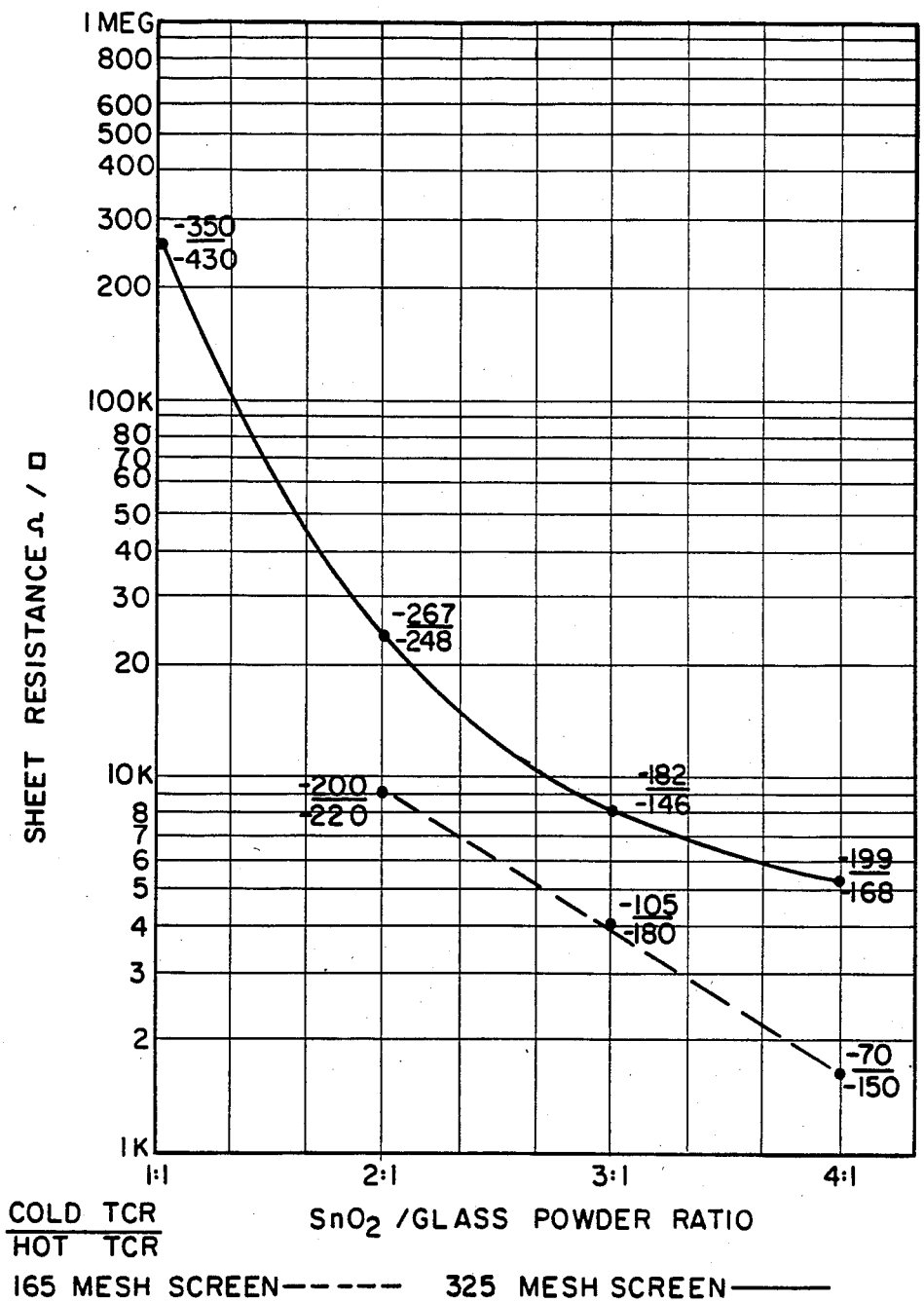

BASE METAL RESISTOR

This application is a divisional application of Ser. No. 705,233 filed Feb. 25, 1985; now U.S. Pat. No. 4,655,965 issued Apr. 7, 1987.

TECHNICAL FIELD

The present invention relates to base metal resistive paint, resistors made from the resistive paint, and a method for making the resistive paint. More particularly, this invention relates to thick film base metal resistive paints comprising 20 to 25% tantala glass frit and 75 to 80% tin oxide, well mixed with 25 to 35% screening agent, to form a base metal resistive paint for firing in an inert atmosphere at a peak temperature of about 900° C. The tantala glass frit preferably comprises 5 to 25% tantatum oxide. The tin oxide is preferably preheated at 450° to 600° C. in the presence of a reducing gas, prior to mixing with the tantala glass frit. The screening agent preferably forms no carbon residue when pyrolytically decomposed in an inert atmosphere.

BACKGROUND ART

Tin oxide compounds have been used as a major conductive material in resistors for many years. Tin oxide films may be processed by spraying and heating a tin chloride solution; by evaporation or sputtering technology, by chemical vapor disposition, or by thick film technology.

Thick film technology has been used in the electronics industry for more than 25 years. Thick film technology includes printing and firing a resistive paint in a desired pattern upon a suitable substrate. Resistive paints used in thick film technology typically include a conductive material, a glass frit, and a screening agent.

Early thick film resistive paint patents varied only in the composition of the conductive materials. The glass frit, after melting, was used primarily as a bonding agent to bond the conductive material to the substrate. The chemical composition of the glass frit was considered important only in regard to its melting point which was required to be below the melting point of the conductive material used. The screening agent was selected for consistency and ease of printing. Commercially available glass frits and screening agents were typically used.

Certain materials were typically mixed with tin oxide powder to obtain the wide range of resistivity and low TCR (temperature coefficient of resistance) desired.

Dearden, in an article published in Electronic Components Magazine in March, 1967, entitled *High Value, High Voltage Resistors* discloses the use of doped antimony oxide with tin oxide to make a binary resistive paint, but the best TCR obtained was −1500 ppm/°C. Kamigaito (U.S. Pat. No. 3,915,721) patented a ternary conductive paint material including powders of 2% tantalum oxide, antimony oxide and tin oxide. Kuden et al. (U.S. Pat. No. 3,928,242) discloses the use of tantala glass frit for use with ruthenium oxide resistors. Moriguchi et al. (U.S. Pat. No. 3,900,330) patented a zinc-sealing glass containing 0.1 to 25% $Ta_2O_5$ to improve surface charge density. Wahlers et al. (U.S. Pat. No. 4,065,743) patented the use of binary conductive materials of tin oxide and tantalum oxide powders for use with standardized glass frit. Wahlers et al. (U.S. Pat. No. 4,215,020) also patented ternary conductive materials for use with tin oxide resistors. Recently Wahlers et al. (U.S. Pat. Nos. 4,378,409 and 4,397,915) claimed a tin oxide material for use with a 30 to 40% barium oxide glass frit, and a glass frit with more than 20% silicon oxide.

Chemical compounds found in a typical glass frit are mineral and inorganic. These chemicals typically exhibit a number of undesirable properties, such as: high TCR; widely variable thermal stability; poor short time overload characteristics; variable resistance values due to uneven mixing; and visible cracks and fissures. A base metal resistive paint is a resistive paint having no noble metals included in its composition.

DISCLOSURE OF THE INVENTION

The present invention discloses a tantala glass frit, preferably a tantala strontium glass frit, for use in mixing with tin oxide and a screening agent, preferably a non-carbon residue organic compound screening agent to form a base metal resistive paint for screening upon a substrate for subsequent firing in an inert atmosphere at a peak temperature of approximately 900° C. The tantala glass frit and tin oxide are preferably ground to a particle size of 10 microns or less prior to mixing.

The tantala glass frit powder is well mixed at a ratio of 20 to 25% with 75 to 80% tin oxide powder. A screening agent in the ratio of 25 to 35% is added to the tantala glass frit and tin oxide powders, and well mixed to form a base metal resistive paint for subsequent screening and firing in an inert atmosphere at a peak temperature of 900° C.±20° C. to form a resistive pattern upon a substrate with a TCR within ±300 ppm/°C.

The disclosed resistive paint exhibits improved thermal stability and short time overload; maintains a tight resistance value due to improved homogeneous mixing of the chemical compounds; and improves physical appearance by reducing the observable cracks and fissions in the fired resistive paint screened upon a suitable substrate. Furthermore, a cost savings in energy, furnace life and maintenance is realized by firing at a peak temperature of 900° C., as compared with firing at peak temperatures of 1000° C. to 1100° C., as currently practiced for firing most tin oxide resistive paints.

Therefore, one object is to provide an improved thick film resistive paint.

Another object is to provide a resistive paint mixed from tantala glass frit, tin oxide powders, and a screening agent to form a resistive paint whose TCR is within ±300 ppm/°C.

Another object is to provide a method for manufacturing a resistor made from tantala glass frit and tin oxide powders.

Another object is to provide a screening agent having no carbon residue when pyrolytically decomposed in an inert atmosphere, for use with a base metal resistive paint.

Yet another object is to provide a tantala glass frit and tin oxide resistive paint suitable for firing at a peak temperature of approximately 900° C.

Still another object is to provide a resistor made from a resistive paint embodying any of the objects previously disclosed. The above-mentioned and other features and objects to this invention and the manner of attaining them will be best understood by reference to the following description of an embodiment of the invention, when considered in conjunction with the accompanying drawings.

BRIEF DESCRIPTION OF THE DRAWINGS

FIG. 2A is a graph comparing the effects of firing temperatures on TCR ($SnO_2$ reduced at 450° C.).

FIG. 2B is a graph comparing the effects of firing temperatures on sheet resistance in ohms/square ($SnO_2$ reduced at 450° C.).

FIG. 3 is a graph comparing the ratios of $SnO_2$/tantala glass on sheet resistance and TCR.

BEST MODE FOR CARRYING OUT THE INVENTION

Figure 1:
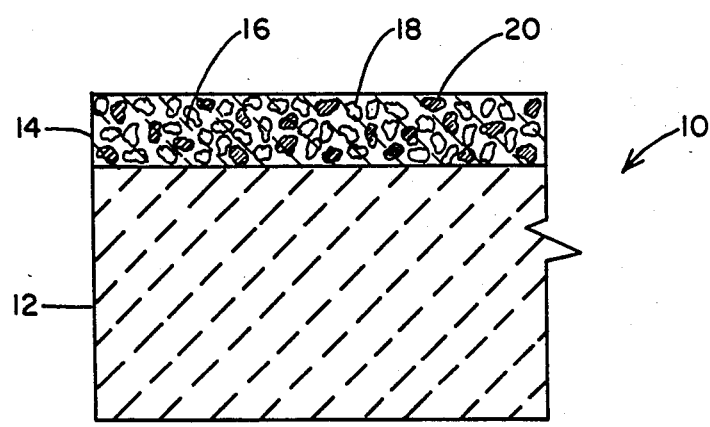
FIG. 1 shows a partial sectional view of a resistor prior to firing made with the resistive paint of the present invention.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows a base metal resistor of the present invention prior to firing, generally designated 10. Resistor 10 comprises a substrate 12, such as a ceramic substrate, having a layer of the resistive paint 14 of the present invention screened or otherwise coated thereon for subsequent firing. The resistive paint 14 comprises a mixture of tantala glass frit 16 and tin oxide 18 in a preferred ratio of 20 to 25% tantala glass frit to 75 to 80% tin oxide. Note: all compositions disclosed herein are based upon weight percentage.

The tantala glass frit 16 preferably has a melting point of 800° C. or less, and comprises from five to twenty-five percent tantatum oxide ($Ta_2O_5$). The tantala glass frit 16 preferably comprises, at least in part, strontium oxide (SrO), or strontium peroxide ($SrO_2$). The glass 17 and tantala 19 are preferably ground to a particle size of ten microns or less, then well mixed, remelted and ground to form the tantala glass frit 16 of the present invention.

The tantala glass frit 16 and tin oxide 18 are preferably ground to a particle size of ten microns or less, and the resulting powders are added to a screening agent 20 in a ratio of 65 to 75% tantala glass frit and tin oxide powders to 25 to 35% screening agent. The screening agent 20 preferably forms no carbon residue when pyrolytically decomposed in an inert atmosphere, such as 10% butyl-methacrylate dissolved into 90% pine oil.

The solvent used for making the screening agent can be pine oil, terpineol, an ester alcohol of Texanol from Texas Eastman Company, butyl carbitol acetate or the like. The resins used for binders can be polyalkylmethacrylate available from DuPont or Rohm and Haas; or polybutenes available as Amoco H-25, Amoco H-50, and Amoco L-100 from Amoco Chemicals Corporation. A wetting agent may be added to wet the solid powders for good paint rheology.

Some commercially available screening agents after firing in an inert atmosphere at high temperature contain carbon residue, which is conductive. Such carbon residue is not combined with oxygen to form a carbon oxide during heating in an inert atmosphere, therefore the carbon in the screening agent remains in the resistive paint, adversely affecting the controlled performance characteristics of the resistor 10.

As shown in FIG. 1, the tantala glass frit 16 contains a well blended mixture of tantala 19 and glass 17, which has been remelted and ground to form the tantala glass frit 16 of the present invention. The tantala glass frit 16 when mixed with tin oxide 18 provides a more homogenous mixture than can be readily obtained by admixing tantalum oxide to the resistive paint 14 during the mixing operation. Thus, as shown in FIG. 1, the tantala glass frit 16 and tin oxide 18 are well dispersed within the layer of resistive paint 14. The resulting resistance characteristics are thereby improved resulting in a more homogenous mixture of resistive paint 14, which provides improved and more controllable conductive characteristics, as will hereinafter be disclosed.

Figure 4:
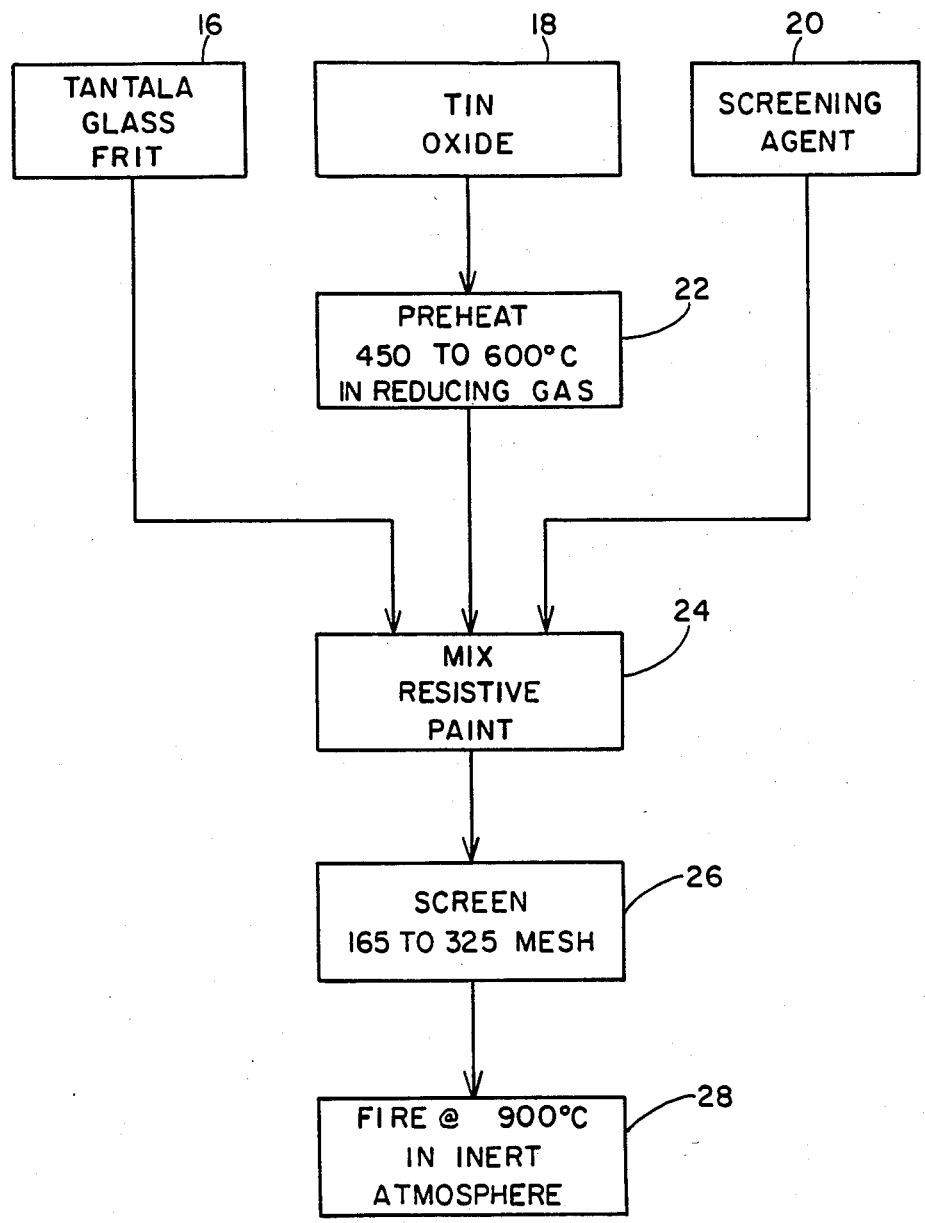
FIG. 4 is a flow chart showing the method of processing a resistor for tantala glass frit, tin oxide, and a screening agent.

As shown in FIG. 4, the tin oxide 18 is preferably preheated 22 in a reducing gas to a temperature of from 450° C. to 600° C., for a time sufficient to reduce the oxide to a desired level. When preheating 22 is done in a tube furnace, the tin oxide 18 is preheated for 10 minutes to one hour in a forming gas such as 2 to 7% $H_2$ and 93 to 98% $N_2$ atmosphere. The preheated 22 tin oxide 18 is then mixed 24 with the tantala glass frit 16 and the screening agent 20, preferably in a three roll mill (not shown) to yield a constant resistive paint 14 having uniform dispersions of tantala 19 and tin oxide 18 throughout, in the desired proportions previously disclosed.

The screening agent 20 is preferably an organic compound which is free of carbon residue when pyrolytically decomposed in an inert atmosphere. A binding resin 21 may be incorporated in the screening agent 20 to improve the binding properties of the mixed resistive paint 14, prior to firing 28. Once the tantala glass frit 16, tin oxide 18, and screening agent 20 are mixed 24 into a homogeneous resistive paint material 14, they are subsequently screened 26, preferably through a silk or stainless steel screen, onto a substrate 12. Substrate 12 is preferably an alumina substrate that has been prefired onto a thick film copper conductor in an inert atmosphere at about 900° C. The screen aperture size affects the resistive quality of the fired resistive paint, as will be subsequently disclosed. The preferred screen aperture size is from 165 to 325 mesh.

After screening, the resistive paint 14 disposed upon substrate 12 is preferably allowed to dry prior to firing 28. The resistive paint and substrate are subsequently fired 28 at a peak temperature of 900° C.±20° C., in an inert atmosphere such as nitrogen, to form a vitreous enamel base metal resistor material fused to the substrate.

TABLE I

| Properties | Example 1 | Example 2 | Example 3 | Example 4 |
| --- | --- | --- | --- | --- |
| ohms/sq. | 60K | 31K | 9K | 15K |
| Cold TCR | −13900 | −2270 | −285 | −183 |
| Hot TCR | −6400 | −1074 | −279 | −187 |
| Thermal Stability | 2% | 4% | 0.3% | 0.3% |
| STOL | 3% | 4% | 0.05% | 0.01% |

As shown in Table I, Examples #1 through #4 demonstrate the advantages of the addition of $Ta_2O_5$ (tantalum oxide) to the glass frit by comparison of 0%, 2%; 5% and 20% $Ta_2O_5$. Each example was tested to determine the ohms/square; Hot and Cold TCR; Thermal Stability; and STOL.

In each of the following examples the Cold TCR was tested at $-55°$ C. to $+25°$ C.; the Hot TRC was tested at $+25°$ C. to $+125°$ C.; Thermal Stability was tested at 150° C. for 48 hours; the STOL was tested at 500 volts or 5 watts maximum; and the resistor size tested was 0.062×0.156 inches, or 2.5 squares.

Example #1 comprises a glass frit, having no (0%) $Ta_2O_5$, with (5%) $SiO_2+(35\%)$ $SrO+(60\%)$ $B_2O_3$. These materials were heated to 1200° C. to form a homogeneous glass frit. This glass frit was then ground into a fine powder having a particle size of ten microns or less. $SnO_2$ (tin oxide) was then added to the glass frit in a ratio of (75%) $SnO_2+(25\%)$ glass frit. No $Ta_2O_5$ was present in Example #1. The materials were well mixed with (30%) no carbon residue screening agent to yield a resistive paint, which was subsequently screened and fired at 900° C. in an inert atmosphere as previously disclosed. As shown in Table I, Example #1, the ohms/square was 60K; the hot and cold TCR values were extremely high; the thermal stability was 2%; and the STOL was 3%.

Example #2 comprises the glass frit of Example #1, wherein (2%) $Ta_2O_5$ was added to the glass frit prior to heating. After heating and grinding, $SnO_2$ was added to the glass frit in a ratio of (75%) $SnO_2+(25\%)$ glass frit having (2%) $Ta_2O_5$ therein. These materials were well mixed with (30%) no carbon residue, organic screening agent to yield a resistive paint, which was subsequently screened and fired at 900° C. in an inert atmosphere, as previously disclosed. As shown in FIG. 4, Example #2, the ohms/square was 31k; the Cold TCR was $-2270$; the Hot TCR was $-1074$; the thermal stability was 4%; and the STOL was 4%.

Example #3 comprises the glass frit of Example #1, wherein (5%) $Ta_2O_5$ was added to the glass frit prior to heating. After heating and grinding, $SnO_2$ was added to the glass frit in a ratio of (75%) $SnO_2+(25\%)$ glass frit having (5%) $Ta_2O_5$ therein. These materials were well mixed with (30%) no carbon residue, screening agent to yield a resistive paint, which was subsequently screened and fired at 900° C. in an inert atmosphere, as previously disclosed. As shown in Table I, Example #3, the ohms/square was 9K; the Cold TCR was $-285$; the Hot TCR was $-279$; the thermal stability was 0.3%; and the STOL was 0.05%.

Example #4 comprises the glass frit of Example #1, wherein (20%) $Ta_2O_5$ was added to the glass frit prior to heating. After heating and grinding, $SnO_2$ was added to the glass frit in the ratio of (75%) $SnO_2+(25\%)$ glass frit having (20%) $Ta_2O_5$ therein. These materials were well mixed with (30%) no carbon residue, screening agent to yield a resistive paint, which was subsequently screened and fired at 900° C. in an inert atmosphere, as previously disclosed. As shown in Table I, Example #4, the ohms/square was 15K; the Cold TCR was $-183$; the Hot TCR was $-187$; the termal stability was 0.3%; and the STOL was 0.01%.

As shown in Examples #1 through #4, the addition of $Ta_2O_5$ to the glass frit varies the TCR considerably. The addition of 5% $Ta_2O_5$ to the glass frit as shown in Example #3 brings the TCR to less than ±300 ppm/°C., which is considered acceptable for most thick film applications. The addition of 20% $Ta_2O_5$ to the glass frit as shown in Example #4, brings the TCR to less than ±200 ppm/°C. which is preferred.

Another significant improvement is in thermal stability and STOL. 2 to 4% variation shown in Examples #1 and #2, is unacceptable for most applications. However, increasing the content of $Ta_2O_5$ to 5% or more brings the thermal stability and STOL to 0.3% or less, which is within a preferred range of less than 0.5% required for most stringent thick film resistor applications.

The addition of $Ta_2O_5$ to the glass frit to form a tantala glass frit provides a more homogeneous and uniform resistor paint, compared with the admixture of $Ta_2O_5$ particles, tin oxide, non-tantala glass frit, and screening agent. Using the same percentage composition, the CV (coefficient of variance) of tantala glass frit is 8 to 9% as compared to 13 to 14% for admixture compositions.

Any improvement in print technology and paint rheology will improve the CV in equal proportion. That is, an improvement in print-technology and paint rheology reducing admixture compositions to a CV of 10 to 11%, will also reduce tantala glass frit resistors to a CV of 5 to 6%, which remains a significant improvement.

Typically, thick film base metal resistors using tin oxide are fired at 1000° C. or above (ref. U.S. Pat. Nos. 4,137,519 and 4,065,743) to improve thermal stability. At lower temperatures the glass frit is not well sintered, reducing thermal stability. By addition of 5% or more $Ta_2O_5$ to the glass frit, the frit is well sintered at 900° C.±20° C.

Figure 1A:
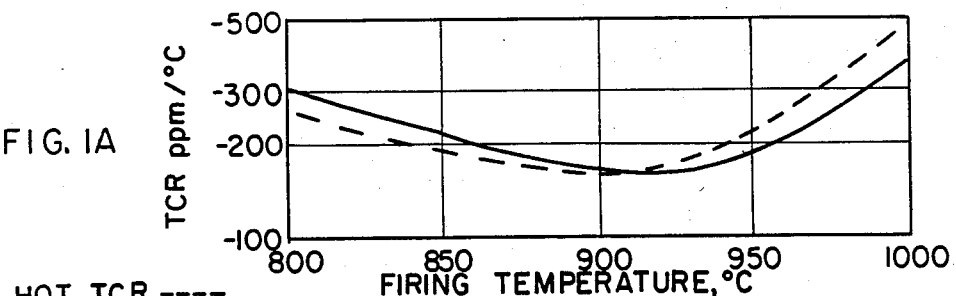
FIG. 1A is a graph comparing the effects of firing temperatures on TCR ($SnO_2$ reduced at 520° C.).
Figure 1B:
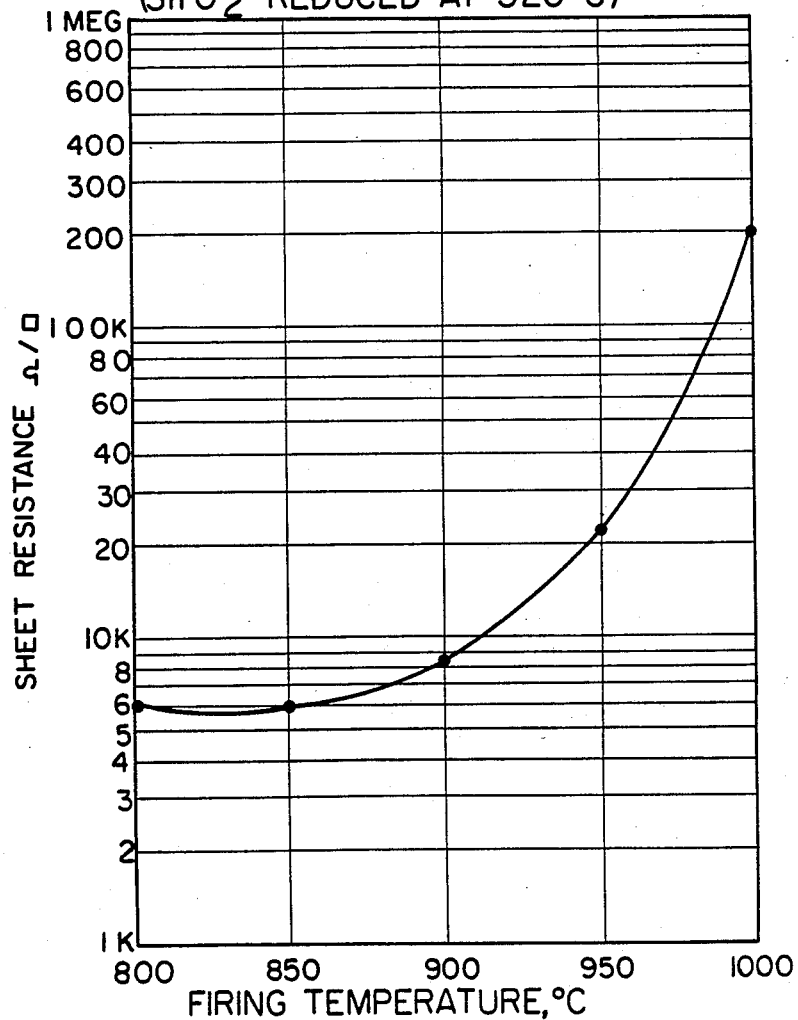
FIG. 1B is a graph comparing the effects of firing temperatures on sheet resistance on ohms/square ($Sno_2$ reduced at 520° C.).

Using the formulation disclosed in Table I Example #4 above, and varying the firing temperature in an inert atmosphere from 800° C. to 1000° C., as shown in FIGS. 1A and 1B, the most stable Hot and Cold TCR occur at approximately 900° C.±20° C.

As shown in FIG. 1A, using a firing temperature of 900° C.±20° C., both Hot and Cold TCR values are less than ±200 ppm/°C., which is desirable for high reliability resistor applications.

As shown in FIGS. 2A and 2B, $SnO_2$ was preheated in a reducing atmosphere of 7% $H_2$ and 93% $N_2$ at a temperature of 450° C., prior to mixing the $SnO_2$ with the tantala glass frit of Example #4 in a ratio of 3:1, (75%) $SnO_2+(25\%)$ tantala glass frit. These materials were well mixed with (30%) of a no carbon residue, screening agent to yield a resistive paint, which was subsequently screened upon a substrate and fired in an inert atmosphere at various temperatures from 800° C. to 1000° C. shown in FIGS. 2A and 2B. As shown in FIG. 2A, the most stable Hot and Cold TCR values are obtained at a peak firing temperature of 900° C.±20° C. These TCR values fall within ±100 ppm/°C., which is most desirable for the most stringent resistor applications.

FIG. 3 shows the effect on sheet resistance and Hot and Cold TCR when the ratios of $SnO_2$ to tantala glass frit are varied, and the resulting mixture is screened and fired in an inert atmosphere at a peak temperature of 900° C. At ratios between 3:1 and 4:1, the resulting Hot and Cold TCR are less than ±200 ppm/°C.; and the sheet resistances in ohms/square are less than 10K.

FIG. 3 also shows the effect of screening through a 325 mesh screen in solid line; and the effect of screening through a 165 mesh screen in dashed line. Thus, it is noted that the larger the screen mesh size, the lower the resistance values and the more positive the TCR. However, as shown in FIG. 3, any screen size from 165 mesh to 325 mesh may be used to yield a TCR within ±200 ppm/°C., when the ratio of $SnO_2$ to tantala glass frit is within the preferred range of from 3:1 to 4:1.

Thus, from Examples #1 through #4, and FIGS. 1A through 3 and Table I, it is disclosed that the preferred quantity of tantala glass frit is from 20 to 25% and the preferred quantity of tin oxide is from 75 to 80%, for best TCR results. If tin oxide is present in excess of 80%, the adhesion of the resistor paint to the substrate is weakened, and thermal stability is impaired. If more than 25% tantala glass frit is present, the TCR becomes too negative.

Thus, a base metal resistor paint for firing on a substrate to form a controlled temperature coefficient of resistance within ±300 ppm/°C. is disclosed for use with high reliaiblity, thick film resistor applications.

Therefore, while this invention has been described with reference to a particular embodiment, it is to be understood that modifications may be made without departing from the spirit of the invention or from the scope of the following claims.

Industrial Applicability

This invention discloses a method for preparing a base metal resistive paint for subsequent screening and firing on a substrate to make a base metal thick film resistor for use in an electronic circuit.

I claim:

1. A thick film base metal resistor having a substrate with a resistive paint screened and fired thereon, wherein the improvement comprises:
    (a) blending a tantala glass frit with a tin oxide in the ratio of one part tantala glass frit with three to four parts tin oxide;
    (b) mixing the combined tantala glass frit and tin oxide with a screening agent in the ratio of 25 to 35% by weight screening agent to 65 to 75% of the blend of tantala glass frit and tin oxide to yield a resistive paint;
    (c) screening the resistive paint upon a substrate, and
    (d) subsequently firing the substrate with resistive paint screened thereon in an inert atmosphere at a peak temperature of 900° C.±20° C.

2. The resistor of claim 1, in which the tantala glass frit and tin oxide are ground to a particle size of ten microns or less.

3. The resistor of claim 1, in which the tin oxide is preheated in a reducing gas at a peak temperature of 450° C. to 600° C.

4. The resistor of claim 1, in which the screening agent forms no carbon residue when pyrolytically decomposed in an inert atmosphere.

5. The resistor of claim 1, wherein the tantala glass frit contains from five percent to twenty-five percent tantalum oxide of the formula $Ta_2O_5$, by weight.

6. A thick film resistor, made by screening a base metal resistive paint upon a substrate, and firing in an inert atmosphere, which comprises:
    (a) a mixture of glass frit, well blended with from 5 to 25 percent of a tantalum oxide, the mixture melted and reground to form a tantala glass frit therefrom;
    (b) the tantala glass frit then mixed with a tin oxide pre-heated in a reducing atmosphere at a peak temperature of from 450° C. to 600° C.; and a screening agent selected to be substantially vaporized during firing; the tantala glass frit and tin oxide blended in the ratio of 75 to 80 percent tin oxide to 20 to 25 percent glass frit; and further blended with 25 to 35 percent screening agent, by weight, to form the base metal resistive paint therefrom;
    wherein the base metal resistive paint is screened in a desired pattern upon the substrate and fired in an inert atmosphere at a peak temperature of 900±20° C., to form the thick film resistor having a controlled temperature coefficient of resistance within ±300 ppm/°C.

* * * * *